Oct. 22, 1929.  A. A. MUENCH  1,732,854
RESILIENT TIRE
Filed Feb. 11, 1927  2 Sheets-Sheet 2

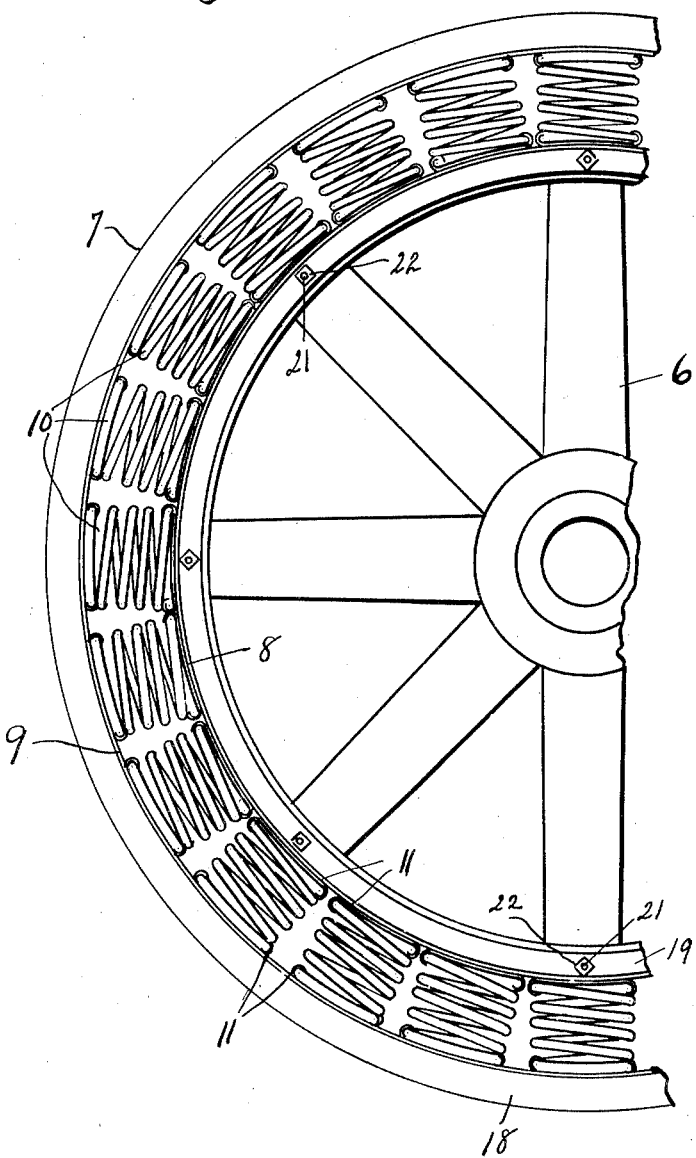
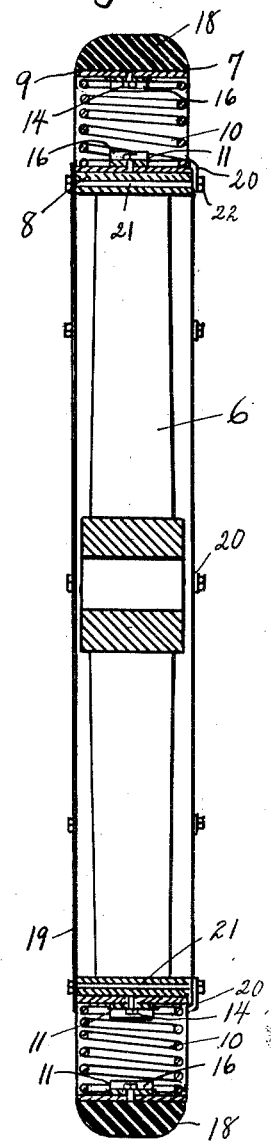

INVENTOR
August A. Muench
By W. W. Williamson Atty.

Patented Oct. 22, 1929

1,732,854

UNITED STATES PATENT OFFICE

AUGUST A. MUENCH, OF CAMDEN, NEW JERSEY

RESILIENT TIRE

Application filed February 11, 1927. Serial No. 167,402.

My invention relates to new and useful improvements in a resilient tire, and has for its primary object the construction of a simple and effective device of this character as a substitution for the ordinary pneumatic tire of present day formation. While the tension of the springs is governed, to a large extent, by the weight of the vehicle on which the wheel is to be used, said springs may be varied to provide the resiliency of either a balloon or higher pressure tire.

Another object of the invention is the provision of a resilient tire wherein springs are used in place of air to give the desired cushioning effect which will absorb the shocks incident to travel over a roadway without the possibility of blow-outs or punctures.

A further object of my invention is to provide a clamp of unique construction for fastening each end of each spring to the inner and outer tire rims.

A still further object of this invention is to provide clamps which will securely attached the ends of a spring to tire rims by the use of a single fastening means for each clamp, and when said clamps are placed will hold the spring against rotation.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a fragmentary side elevation of a wheel showing a resilient tire embodying my invention mounted thereon.

Fig. 2, is a diametrical sectional view thereof.

Figure 3:
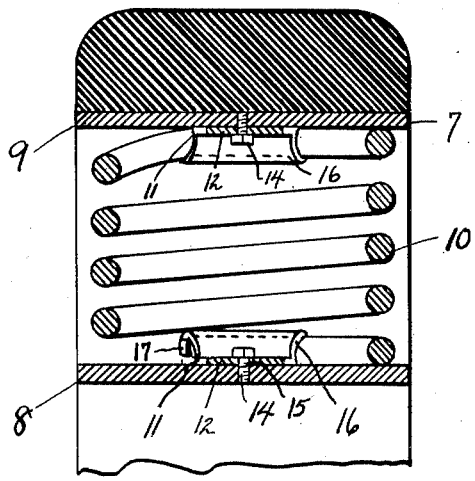
Fig. 3, is an enlarged sectional view of the tire per se.

In carrying out my invention, as herein embodied, 6 represents a wheel of any ordinary or usual construction on which is mounted my resilient tire denoted as a whole by the reference numeral 7.

The resilient tire proper includes inner and outer concentric tire rims, 8 and 9 respectively between which are mounted a plurality of radially arranged helical springs 10, each end of each spring being held in place by a clamp 11.

Each clamp includes an arcuate body 12 curved longitudinally to approximately correspond to the curvature of a tire rim to which it is secured by a single fastening means 14, such as a bolt, rivet or the like. Where a bolt is used, it is preferably passed through the clamp and screwed into its rim thereby permitting detachment of the clamp for replacement of a part which may have become damaged. The fastening means, of whatever character, passes through a hole 15 in the center of the clamp body.

Figure 4:
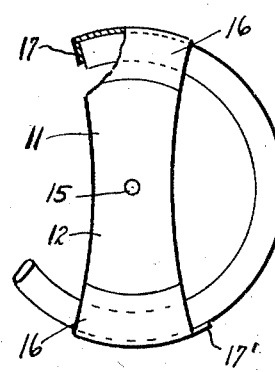
Fig. 4, is a plan view of one of the clamps with a portion broken away and a part of the spring therein.

At each end of the body of the clamp is produced a hook 16 curved laterally to correspond with the coils of the springs 10, as shown in Fig. 4.

Each hook 16 of a clamp is provided with a tongue 17—17' at one side, and the tongue of one hook is at the side opposite the tongue of the other hook. As plainly shown in Fig. 4, the tongue 17 is bent inward so as to be disposed across the hook channel and engages an end of a spring to prevent rotating movement of the spring and clamp relative to one another in one direction, and since one clamp coacts with one end of a spring, and another clamp with the other end of said spring, the latter is held against rotary movement in either direction.

The clamps engaging diametrically opposite points of the springs in the direction of travel of the tire when in use or circumferentially of said tire, any lost motion of said spring is practically obviated.

On the outer tire rim is vulcanized or otherwise fixed the tread 18 of rubber or a combination of rubber and fabric.

The tire is mounted on the wheel and is held against lateral movement in one direction by a stop 19 in the form of a projection from the wheel or a ring secured to the side of said wheel, and is removably held in place by lugs 20 secured to the wheel by bolts 21 and nuts 22.

From the foregoing it will be obvious that I have produced an exceedingly simple but effective resilient tire capable of being readily mounted upon or removed from a wheel of ordinary construction and which when in use will give substantially the same cushioning effect as a pneumatic tire without the disadvantages thereof.

Figure 6:
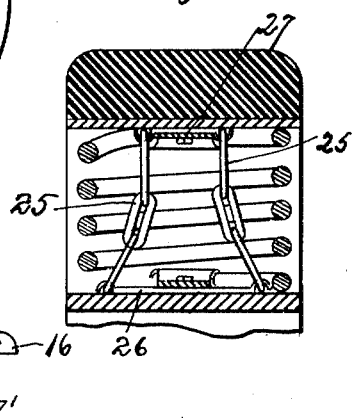
Fig. 6, is a view similar to Fig. 3 showing stud links.
Figure 5:
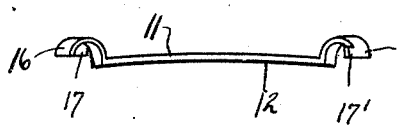
Fig. 5, is an edge view of one of the clamps.

In Fig. 6 I have illustrated a construction for preventing undue sidewise stress upon the springs 10 in which the stress links 25 are secured to the concentric rims 8 and 9 in such manner that should the rim 9 be forced sidewise one or the other of the series of the nest of links will be drawn taut and limit this sidewise movement. This is of prime importance where a vehicle equipped with these tires travels over rough roads or turns short curves at high speed. A plate 26 may be used to attach the ends of the links to the inner rim and a plate 27 for attaching the opposite ends of the links to the outer rim.

Of course I do not wish to be limited to the exact details of construction as herein shown as these may be varied within the limits of the appended claims without departing from the spirit of my invention.

Having thus fully described my invention, what I claim as new and useful is:

1. The combination with a resilient tire including a pair of spaced concentric rims, and helical springs located between said rims, of clamps secured to said rims and engaging the springs, plates disposed between the clamps and their respective rims, and stress links attached to the sides of each pair of said plates contiguous each spring and at angles to each other, as shown.

2. In a resilient tire having an inner and an outer rim and coiled springs located between said rims, clamps to fasten the ends of the springs to the rims, each clamp including a body curved longitudinally, a hook at each end of the body, a tongue projecting from one side of each hook, the tongue of one hook being on the side opposite the ongue of the other hook.

3. In a resilient tire, having an inner and an outer rim and coiled springs located between said rims, clamps to fasten the ends of the springs to the rims, each clamp including a body, a hook at each end of the body and for engagement with a spring coil, and a tongue projecting from one side of a hook, and disposed across the channel of said hook to engage an end of the spring to prevent rotary movement of the spring in one direction relative to the clamp.

4. In a resilient tire having a pair of concentric rims with springs located between them, clamps to fasten the ends of said springs to said rims, means carried by the clamps and disposed across the terminals of the springs to prevent rotation of the latter.

In testimony whereof, I have hereunto affixed my signature.

AUGUST A. MUENCH.